John A. Comstock
Combined Planter and Roller.
No. 118,342. Fig. 1. Patented Aug. 22, 1871.
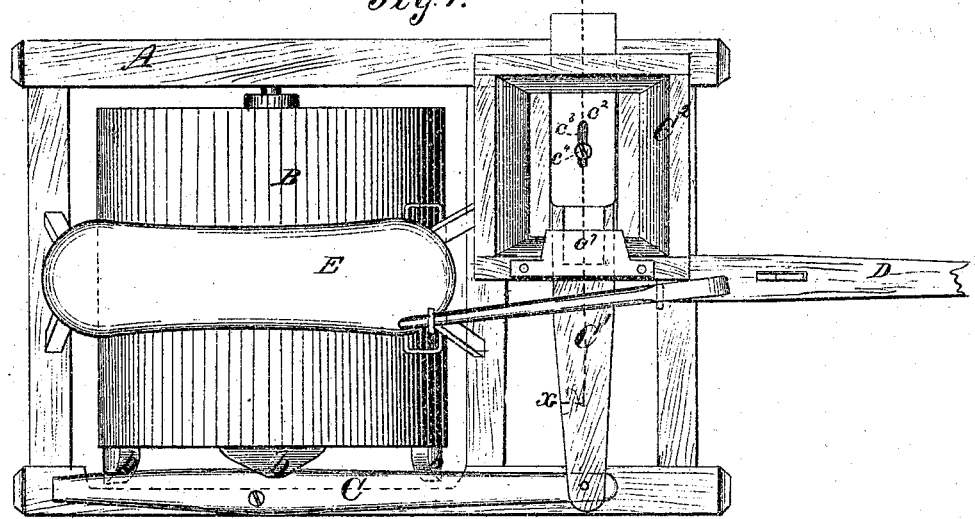
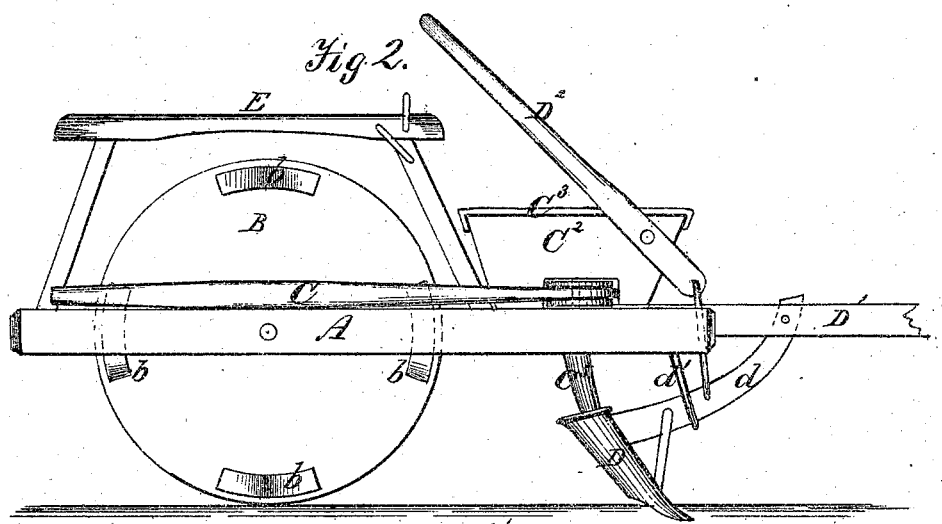
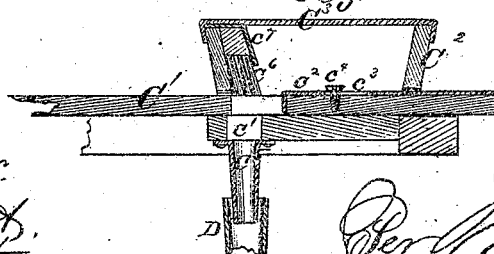
Witnesses.
Inventor.
John A. Comstock
Per Edson Brothers
Atty

UNITED STATES PATENT OFFICE.

JOHN A. COMSTOCK, OF BOWLING GREEN, MISSOURI.

IMPROVEMENT IN COMBINED PLANTERS AND ROLLERS.

Specification forming part of Letters Patent No. 118,342, dated August 22, 1871.

*To all whom it may concern:*

Be it known that I, JOHN A. COMSTOCK, of Bowling Green, in the county of Pike and State of Missouri, have invented a certain new and useful Improvement in Combined Planter and Roller; and I hereby declare the following to be a full, clear, and exact description thereof, reference being had to the accompanying drawing forming a part of the same, in which—

Figure 1 represents a plan view of my planter and roller. Fig. 2 is a side elevation of the same, and Fig. 3 is a sectional view taken through the dotted line $x$ $x$ of Fig. 1.

Similar letters of reference in the several figures refer to like parts.

This invention refers to an improved planter and roller; and it consists of the constituent parts thereof, combined, constructed, and operating substantially as hereinafter set forth and claimed.

To enable others to make and use my invention, I will proceed to describe its construction and operation.

In the annexed drawing, A refers to a frame of a rectangular or other suitable shape, between and in the inner sides of the longitudinal bars of which the roller B has its bearings, it being provided with axles for that purpose. The roller B is supplied with four or more projections, $b$ $b$ $b$, secured to one end thereof by nails or otherwise. These projections are beveled, as shown in Fig. 1, and so arranged upon the roller as that, when the said roller is revolved, they will communicate a vibratory motion to the lever C, which in turn imparts a back-and-forth sliding motion to the seed-distributing bar, it being connected to the latter, as hereinafter described. C refers to a lever, having its fulcrum at a point upon one side of the frame A opposite the axis of the roller B, the short, as well as the long arm thereof, being operated upon alternately by the projections $b$ $b$ $b$ of roller B and connected by means of a pivot to the seed-distributing bar. $C^1$ refers to the seed-distributing bar, which is supplied with an opening, $c^1$, to receive and carry the seed to their proper destination or to the opening $c^1$ in the bottom of the seed-box $C^2$, (see Fig. 3,) and also supplied with a slide, $c^2$, one end of which is bent downward and made to enter the opening $c^1$ of said bar $C^1$, whereby said opening, by sliding said slide $c^2$ in the required or proper direction, may be contracted or made smaller to adapt the size of the said opening to the quantity of seed to to be planted. The horizontal part of the slide is constructed with an elongated slot, $c^3$, which receives a set-screw, $c^4$, entering the said slide, by means of which slot and set-screw the slide may be adjusted and held at the desired point in regulating the size of the opening $c^1$, above referred to. When the bar $C^1$ is thrown inward its opening, which at that moment forms a receptacle, it being out of line with the opening $c^1$, is filled with and retains the seed obtained from the box $C^2$, and when thrown outward said opening carries the seed to and delivers them into the opening $c^1$, through which they are conveyed to the spout $c^5$, fastened to the under side of the bottom of the seed-box, from which they are taken and conveyed to the furrow in the ground by means of the drill hereinafter referred to. The back-and-forth sliding motion above alluded to, given to the bar $C^1$ causes the said bar to be more or less thrown in and out of the seed-box $C^2$, as just stated. $c^6$ refers to a brush, the handle or block of which is secured within the box $C^2$ by means of a metallic cap, $c^7$, furnished with downward-projecting flanges, embracing said block, and constructed with perforated ears, through which screws or other fastenings entering the said box pass for holding said cap to said box. The lower extremities of the bristles of the brush $c^6$ are made to rest flush with the upper side of the slide $c^2$ when thrown outward, the object of which being to remove the seed deposited upon those filling its opening or receptacle $c^1$, thereby assisting in regulating the quantity of seed to be sown or distributed, it being sufficiently large to cover the said opening in the slide when the former is brought in a line with the said brush and the delivery-opening $c^1$ in the bottom of the seed-box. The seed-box is furnished with a cap or cover, $C^3$. D refers to the seed-drill for making the furrow or opening the same already made by the plow or cultivator, preparatory to depositing the seed in the ground, and through which the seed to be planted are conveyed from the seed-spout $c^5$ to the furrow above alluded to. $d$ is a curvilinear or other suitably-shaped standard, one end of which is fastened and braced to the drill D and the other end thereof pivoted within a slot in the tongue $D^1$ of the machine. $d'$ is a loop or pendant, fastened to the lower side of the front bar of the frame A, and through which the standard $d$ of the drill D passes, the object of which being to furnish means for retaining the said standard in its proper position. $D^2$ refers to a lever, connected to the standard $d$ at its lower end and pivoted to one side of the seed-box, and is for the purpose of operating or elevating and depressing the drill D. E refers to a seat, upon which the operator or driver may sit.

Having thus described my invention, what I claim, and desire to secure by Letters Patent, is—

The roller B $b$ $b$, lever C, bar $C^1$ provided with the slide $c^2$, seed-box $C^2$ having brush $c^6$, and the lifting device, consisting of the lever $D^2$, standard $d$, loop $d'$, and seed-drill D, all constructed and arranged to operate substantially as shown, and for the purpose set forth.

In testimony that I claim the foregoing as my invention I have hereunto set my hand this 28th day of March, A. D. 1871, in presence of two subscribing witnesses.

JOHN A. COMSTOCK.

Witnesses:
  W. H. McALISTER,
  W. B. McALISTER.